(12) United States Patent
Arkfeld et al.

(10) Patent No.: US 12,302,912 B1
(45) Date of Patent: May 20, 2025

(54) SYSTEM AND METHOD FOR GENERATING A SORTATION MODULE AND CARCASS PROCESSING OPTIONS

(71) Applicant: Triumph Foods, LLC, St. Joseph, MO (US)

(72) Inventors: Emily Arkfeld, St. Joseph, MO (US); Eric Psota, Lincoln, NE (US); Kenneth Grannas, III, St. Joseph, MO (US); Matthew England, Kansas City, MO (US); Barry Wiseman, Olathe, KS (US); Stanley Stohr, Lenexa, KS (US)

(73) Assignee: TRIUMPH FOODS, LLC, St. Joseph, MO (US)

( * ) Notice: Subject to any disclaimer, the term of this patent is extended or adjusted under 35 U.S.C. 154(b) by 0 days.

(21) Appl. No.: 18/790,843

(22) Filed: Jul. 31, 2024

Related U.S. Application Data

(62) Division of application No. 18/390,666, filed on Dec. 20, 2023.

(60) Provisional application No. 63/433,823, filed on Dec. 20, 2022.

(51) Int. Cl.
*A22C 17/00* (2006.01)

(52) U.S. Cl.
CPC ........ *A22C 17/002* (2013.01); *A22C 17/0086* (2013.01)

(58) Field of Classification Search
CPC .......................... A22C 17/002; A22C 17/0086
USPC ........................................................ 452/157
See application file for complete search history.

(56) References Cited

U.S. PATENT DOCUMENTS

| | | | |
|---|---|---|---|
| 7,039,220 B2 * | 5/2006 | Kriesel | G01B 11/25 382/110 |
| 7,399,220 B2 * | 7/2008 | Kriesel | A22B 5/201 452/157 |
| 2003/0181156 A1 * | 9/2003 | Pascual | A22B 5/0041 452/52 |
| 2022/0132872 A1 * | 5/2022 | Blaine | G05B 17/02 452/157 |

* cited by examiner

*Primary Examiner* — Richard T Price, Jr.
(74) *Attorney, Agent, or Firm* — Husch Blackwell LLP

(57) ABSTRACT

The disclosure relates to methods for generating carcass processing options based on a primal/subprimal weights and yield training module. In one embodiment, the methods disclosed herein use automated methods to process image data using one or more trained modules, and determine carcass processing options based on an estimated weight calculation output from the trained modules, without using a scale-based weight measurement as an input.

20 Claims, 6 Drawing Sheets

SYSTEM AND METHOD FOR GENERATING A SORTATION MODULE AND CARCASS PROCESSING OPTIONS

CROSS-REFERENCE TO RELATED APPLICATIONS

This Application is a Divisional of and claims priority to U.S. patent application Ser. No. 18/390,666, filed Dec. 20, 2023 to Emily Arkfeld et. al., entitled "System and Method for Generating a Sortation Module and Carcass Processing Options," currently pending, which claims priority to U.S. Provisional Patent Application Ser. No. 63/433,823, filed on Dec. 20, 2022, to Emily Arkfeld et. al., entitled "Systems and Method for Generating a Sortation Module and Carcass Processing Options," the entire disclosures of which are incorporated herein by reference.

BACKGROUND OF THE INVENTION

The meat processing industry has an interest in maximizing the yield from individual animal carcasses through efficient processing methods in order to optimize meat cuts. For example, slaughterhouse systems can be designed to optimize the sorting and classification of carcasses based on a plurality of characteristics in order to predict cuts that will result in the highest yield for each carcass.

Existing solutions for estimating carcass yield or predicting commercial cuts use carcass weight and/or a yield grade metric as a data input to a prediction model. Other existing solutions evaluate primal cuts to provide recommendations for subprimal cuts. Carcass weight is one of the last data items collected on the slaughter floor before advancing to the cut floor, therefore the current solutions do not provide a prediction for primal and sub-primal weights and yield or processing options prior to the primal cut phase when the carcass is still intact on the slaughter floor. Accordingly, a need exists for a solution that accurately predicts carcass and primal/subprimal weights and yields and provides cut recommendations without using scale measured weight or a yield grade metric as a data input to the prediction model and provides analysis and options before primal cuts are made.

BRIEF SUMMARY OF THE INVENTION

The present invention is directed generally to systems and methods for predicting primal/subprimal weights and yield and determining carcass processing options before the carcass enters the cut floor. The system can be provided in the form of a loin boning sortation model designed to characterize carcass processing options based on identified characteristics using an advanced primal/subprimal weights and yield training module.

According to a first embodiment, a system for characterizing carcass processing options can include a memory unit and a processor in communication with the memory unit. The processor can be configured to process a scan image data associated with a carcass or a portion thereof. The processor can also be configured to transform the scan image data into an input data set and compare the input data set to a trained module. The processor can also be configured to generate a carcass processing option, wherein the carcass processing option is generated based on an estimated weight output of a processed carcass, wherein the estimated weight output is calculated without the use of a scaled-based weight measurement input. The processor can further be configured to transmit the carcass processing option to a processing unit configured to process a carcass. In some embodiments, the system can also include a scanning device configured to capture the scan image data. In some embodiments, the scan image data includes a first scan image with a plurality of image data elements and carcass composition metrics and a second scan image with a carcass length. In some embodiments, the scan image data includes a first scan image with a plurality of image data elements and carcass composition metrics. In some embodiments, the scan image data includes an ultrasound image of the carcass. In some embodiments, the plurality of image data elements include a 3D image of the carcass. In some embodiments, the 3D image includes an intensity, an x-coordinate, a y-coordinate, and a z-coordinate. In some embodiments, the estimated weight output includes a bone-in and boneless estimation.

According to a second embodiment, a method for characterizing carcass processing options comprises compiling an input data set and compiling a training data set, the training data set having a respective one of a plurality of data types and a respective known classification value specific to the respective one of the plurality of data types. The method also includes training a plurality of raw training modules with the training data set by iteratively inputting the training data sets into the plurality of raw training modules based on the respective one of the plurality of data types thereof. The training also includes iteratively comparing outputs of the plurality of raw training modules to the respective known classification value for the input ones of the training data set. The training further includes iteratively updating one or more classification guidelines for a respective plurality of nodes of the plurality of raw training modules based on results of the comparing step. The method further includes determining the carcass processing options based on an estimated weight calculation output from the trained module and transmitting the carcass processing options to a processing unit. In some embodiments, the estimated weight output is calculated without the use of a scaled-based weight measurement input. In some embodiments, the input data set includes a plurality of image data elements. In some embodiments, the plurality of image data elements includes a 3D image of a carcass. In some embodiments, the 3D image includes an intensity, an x-coordinate, a y-coordinate, and a z-coordinate.

In a third embodiment, a method for characterizing carcass processing options comprises compiling an input data set including scan image data and compiling a training data set including a plurality of data types and a classification value associated with each of the plurality of data types. The method can further include iteratively training a plurality of raw training modules with the training data set. The method can further include generating a trained module. The method also includes, processing the input data set into the trained module. The method further includes determining the carcass processing options based on an estimated weight calculation output from the trained module. The method also includes transmitting the carcass processing options to a processing unit. In some embodiments, the estimated weight output is calculated without the use of a scale-based weight measurement input. In some embodiments, the estimated weight output includes a bone-in and boneless estimation. In some embodiments, the scan image data includes a plurality of data elements including a first scan image and a second scan image. In some embodiments, the plurality of image data elements includes an ultrasound image of a carcass. In some embodiments, the scan image data elements include a 3D image of a carcass. In some embodiments, the 3D image includes an intensity, an x-coordinate, a y-coordinate, and a z-coordinate.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

Figure 1:
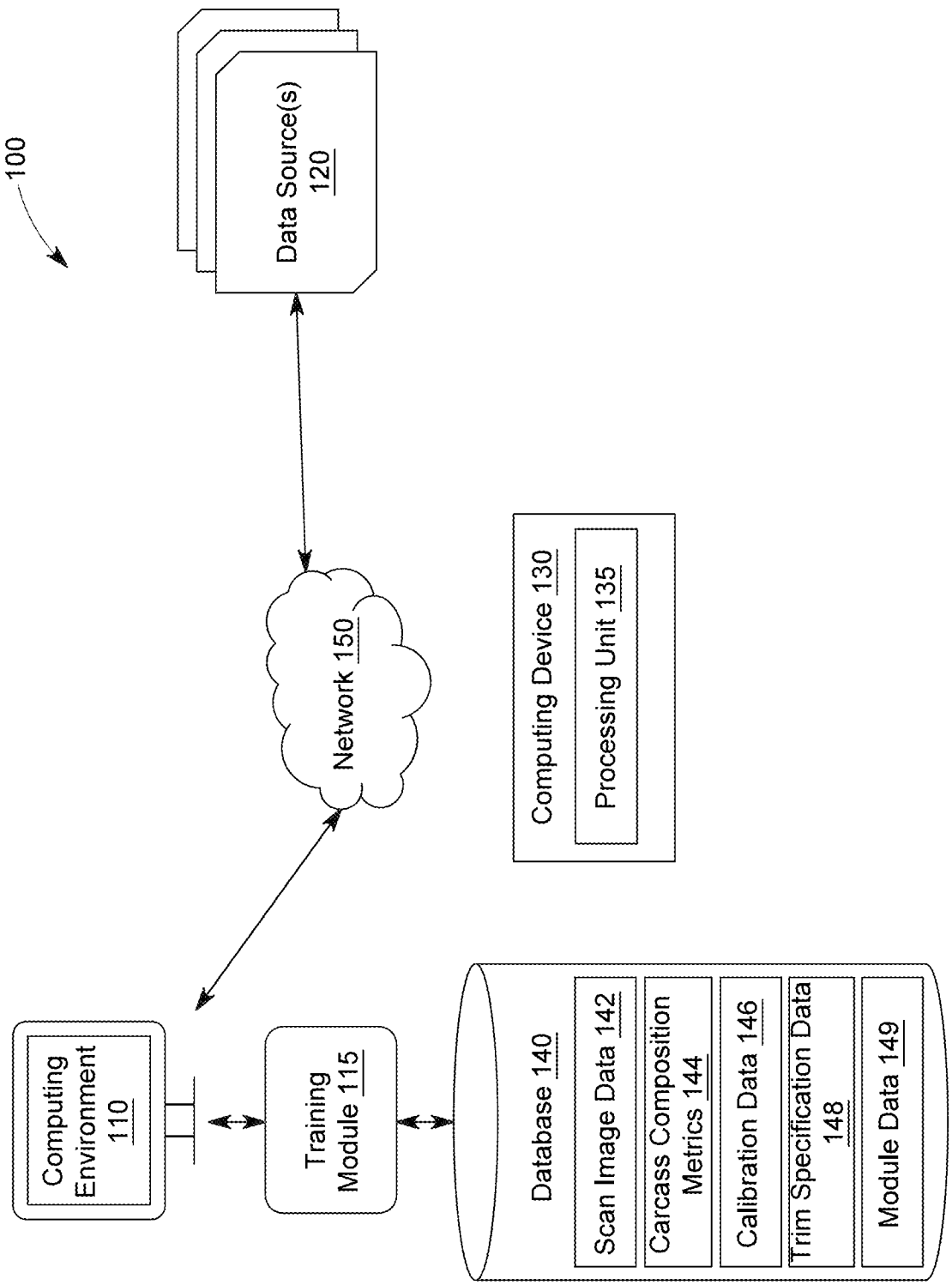
FIG. 1 is a block diagram of a system for generating a carcass processing option model and iteratively training a primal/subprimal weights and yield training module in accordance with an embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. It will be appreciated that some or all of the various features and structures described and shown with respect to each of the specific embodiments referenced herein may be combined to form additional or alternative embodiments having such combinations and that such combinations are within the scope of the present invention.

Referring to the figures, one embodiment and aspect of the present invention is directed toward a system and method for generating a loin boning sortation module for characterizing carcass processing options. In one instance, the system and method are specifically adapted for generating a loin boning sortation model to characterize carcass processing options based on identified characteristics. The system and processes described can also be used to iteratively train a primal/subprimal weights and yield training module. The system is configured to process and transform raw data elements from a plurality of data sources to provide customized processing options based on individualized carcass parameters and an advanced training module. The system may then use an iteratively trained module that can be updated and retrained based on updates to the data elements received from a plurality of data sources to provide customized processing options based on updated classification values, individualized context, and intelligence of the training module.

As described in greater detail herein, the system and method of the present invention can allow for the prediction of primal/subprimal weights and yields and cut weights while the carcass is still intact. In one embodiment, this may be accomplished before making primal cuts and without using scale measured carcass weight or yield grade as inputs. This may in turn allow for cut floor planning to occur in advance of the carcass arriving there, thereby leading to increased efficiency and utilization of the carcass and processing resources. It will be understood that the systems and methods described herein may be utilized in connection with the processing of carcasses of various meat-producing animals including, but not limited to, hogs, beef cattle, lambs, poultry, fish, and others. Although the examples described herein focus on analyzing an intact carcass, it will be understood that the systems and methods described herein may be utilized in connection with the processing of other types of carcasses, including, but not limited to, an eviscerated, split carcass and a carcass side.

FIG. 1 illustrates a networked system 100 for use in generating a carcass processing option model and iteratively training a primal/subprimal weights and yield training module as described herein. In various embodiments, the networked system 100 includes a connected system configured to perform one or more processes for advanced data processing and transforming data into customized processing options based on a plurality of parameters and tunable classification values. The networked system 100 may include, but is not limited to, a computing environment 110, one or more data sources 120, and one or more computing devices 130 that communicate together over a network 150. The network 150 includes, for example, the Internet, intranets, extranets, wide area networks ("WANs"), local area networks ("LANs"), wired networks, wireless networks, or other suitable networks, or any combination of two or more such networks. For example, such networks can include satellite networks, cable networks, Ethernet networks, and other types of networks.

According to some embodiments, the elements of the computing environment 110 can be provided via a plurality of computing devices 130 that may be arranged, for example, in one or more server banks, computer banks, or other arrangements. Such computing devices 130 can be located in a single installation or may be distributed among many different geographical locations. For example, the computing environment 110 can include a plurality of computing devices 130 that together may include a hosted computing resource, a grid computing resource, and/or any other distributed computing arrangement. In some cases, the computing environment 110 can correspond to an elastic computing resource where the allotted capacity of processing, network, storage, or other computing-related resources may vary over time.

In various embodiments, the plurality of data sources 120 generally refers to internal or external systems, databases, scanning devices, or other platforms from which various data is received or collected. In certain embodiments, the plurality of data sources 120 may include either or both of proprietary and non-proprietary data sources, including but not limited to data inputs from third-party systems and/or devices. In another example, the plurality of data sources 120 can include data elements from images collected or received by the computing environment 110.

According to various aspects of the present disclosure, the data may then be processed, cleaned, mapped, triangulated, and validated across the one or more data sources 120. In at least one embodiment, the system updates individualized carcass parameters and uses new image data to create a synced taxonomy to the most up-to-date classification values to provide processing option updates via an AI-powered database. In at least this way, the data specific to each carcass can be collected by the system and tagged based on a plurality of raw data elements so that the data can be further processed and analyzed to provide customized processing options, according to the system and processes described below.

The collected data stored in the one or more databases 140 can include the scan image data 142, carcass composition metrics 144, calibration data 146, trim specification data 148, and module data 149. In at least one embodiment, the system receives or retrieves scan image data 142, which may include but is not limited to a plurality of image data elements, which may include images collected from one or more scanning devices, wherein the images can include raw data points corresponding to a plurality of carcass parameters. The scanning devices can be provided in the form of a 2D camera, a 3D camera, an ultrasound device, an MRI device, a CT device, a video camera, a medical imaging device, or other type of data capture device. In some embodiments, the scanning device can be positioned proximate to a carcass processing chain, conveyor belt, or similar type of transportation device that moves one or more carcasses. In some embodiments, the scanning device can be located proximate to a dorsal side of the carcass and at a predefined distance from the floor. The images may include digital images including photographs, ultrasound images, 3D images, 2D RGB images, or other types of image files or data elements like pixels, vectors, or similar. In some embodiments, the scan image data 142 can include a unique identifier for each image collected, wherein the unique identifier is matched with a unique identifier for each carcass processed.

In some embodiments, the system receives or retrieves carcass composition metrics 144, which can include but is not limited to one or more datasets including carcass traits. In one embodiment, the carcass traits may include but are not limited to measurements for: a fat depth, a loin depth, percent lean, hot carcass weight, image parameters, gender, carcass dimension, and/or kyphosis scores. In one embodiment, the primal/subprimal weights may include but are not limited to the following primal cuts: whole ham, three-piece ham, ham skin and bone, whole loin, strap-on boneless loin, picnic, butt, butt plate, sparerib, backrib, and/or belly. While the primal/subprimal weight measurements may be used in the analysis of the model outcome, it will be recognized by one skilled in the art that the primal weight and/or carcass weight is not used as an input to the carcass processing option model or the primal/subprimal weights and yield training module.

In some embodiments, the system receives or retrieves calibration data 146, which can include but is not limited to a plurality of adjustment factors, applied linearly to the carcass processing option model and the primal/subprimal weights and yield training module after the initial analysis. The adjustment factors may include a plurality of α and β values, applied according to the particular model being evaluated. The adjustment factors are evaluated as [YBoneless_adjusted, YBone-In Adjusted]=[YBoneless, YBone-In]*α+β. In some embodiments, adjustment factors may not be needed and/or applied to the model.

In some embodiments, the system receives or retrieves trim specification data 148, which can include but is not limited to a plurality of trim specifications corresponding to each of the primal and sub-primal cuts to be completed by a processing unit 135 or other processing devices of the system. In some embodiments, the plurality of trim specifications may include detailed processing options regarding one or more of the following: skin-on, skin-off, bone-in, boneless, target separation, the presence or absence of protrusion(s), cut dimensions, muscle dimension(s), fat depth and/or thickness, and an attachment or removal of specific muscles, bones, and/or other carcass components.

The module data 149 can include data associated with iteratively training the training modules and other modeling processes described herein. Non-limiting examples of module data 149 can include but are not limited to, machine learning techniques, parameters, guidelines, emphasis values (e.g., weight values), input and output datasets, training datasets, validation sets, configuration properties, and other settings. In one example, module data 149 includes a training dataset including historical scan image data 142, carcass composition metrics 144, calibration data 146, and trim specification data 148. In this example, the training dataset can be used for training a primal/subprimal weights and yield training module to provide a customized processing option based on a specific carcass parameter or other classification value. For example, the system may use the module data 149 to iteratively train a primal/subprimal weights and yield training module to predict primal/subprimal weights and yield, where the carcass parameters are modeled based on historical data from the one or more database 140 while also incorporating new data from expected new carcass values as animal genetics and carcass parameters evolve over time. The trained primal/subprimal weights and yield training module can be provided in the form of a deep learning prediction module.

The computing device 130 can be any device capable of executing processing options, including a network-capable device. The computing device 130 can include a processor and a memory unit. The computing device 130 can include a display or other interface to configure, monitor, execute, and control various functions of the networked system 100. The computing device 130 may include or otherwise be in communication with a processing unit 135. The processing unit 135 can include one or more machines on a production line that are configured to physically process carcasses according to the customized processing options generated by the system and processes described herein.

The training module 115 can be configured to perform various data processing and transformation techniques to generate input data for training modules and other analytical processes. For example, in some embodiments, the training module 115 can be configured to perform one or more of the data processing and transformation steps of the processes 200, 300, 400, and 500 shown and described in connection with FIGS. 2-5. Non-limiting examples of data processing techniques include, but are not limited to, network resolution, imputation, and missing or null value removal. In one example, the training module 115 performs network resolution on scan image data for a plurality of scans or other images.

Network resolution may generally include identifying certain carcass parameters (e.g., gender) with specific scanned images. In one or more embodiments, the system may perform network resolution to identify data items that refer to the same carcass parameter but may use variations of the data elements collected in a dataset. In a non-limiting example, a dataset may include references to a particular carcass parameter that can then be used in targeted analytics. In a similar scenario, an embodiment of the system may perform network resolution to identify all dataset entries that include a variation of a particular genetic trait or other characteristic and perform advanced analytics on the specific subset of data elements associated with that trait. The training module 115 may further utilize scan image data 142, including historical data, for various analytics to assign known classification values associated with various metrics identified in the scan image data 142. The training module 115 may also analyze extracted data elements with the new data from new scan images, to adjust the classification value(s) of the model associated with the identifiers based on the evaluation of similar metrics and carcass parameters.

Figure 2:
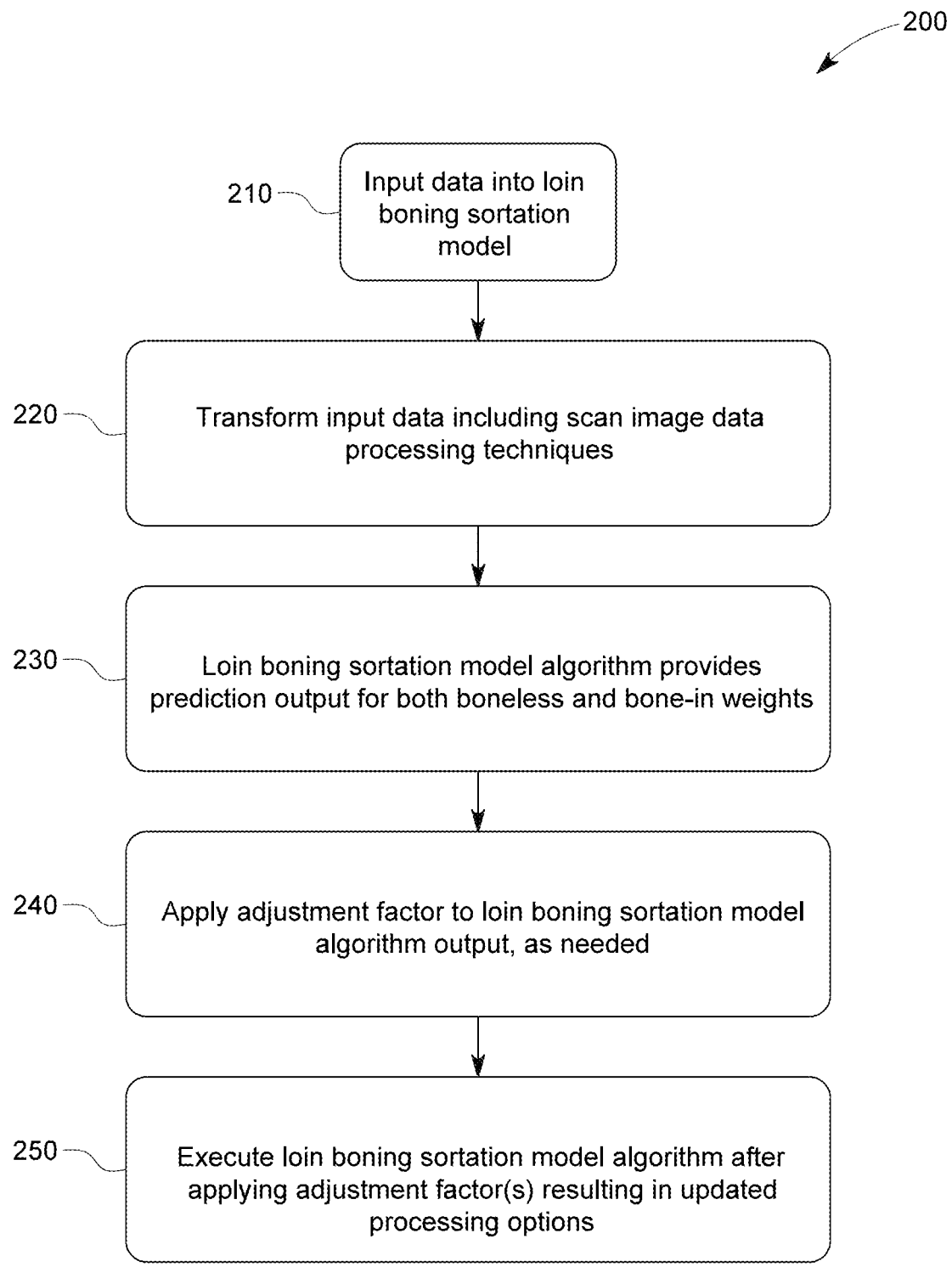
FIG. 2 is a flow diagram of a process for generating a carcass processing option model in accordance with an embodiment of the present invention.

FIG. 2 illustrates a process 200 for generating a loin boning sortation model for characterizing carcass processing options, according to embodiments of the present disclosure. At step 210, the system retrieves input data from a plurality of data sources 120 and/or the one or more databases 140 and compiles the data as an input into the loin boning sortation model. Non-limiting examples of the input data may include scan image data 142 as described in connection with FIG. 1. In some embodiments, the loin boning sortation model may use input data comprising a 3D image information including an intensity, an x-coordinate, a y-coordinate, and a z-coordinate. In one embodiment, the loin boning sortation model may use input data comprising a plurality of layers from scanned ultrasound images. In some forms, the loin boning sortation model may use input data comprising length coordinates as calculated in accordance with process 600 described in connection with FIG. 6. In one embodiment, the loin boning sortation model may use input data comprising image data associated with a carcass before it is opened for evisceration or when determining if a pizzle is present for removal.

In one aspect, the loin boning sortation model may use input data comprising the plurality of layers from the scanned ultrasound images, the length coordinates, and the image data. In this embodiment, the loin boning sortation model can create an input to a deep convolutional neural network that takes, as an input, a stack of ultrasound scans with size 512×512×18 (high in pixels, width in pixels, and number of channels). In some embodiments, the first 16 channels can consist of image data including an ultrasound image. The 17th channel can include the length of a carcass replicated across all 512×512 pixels. The 18th channel can include a binary representation of the pizzle removed status, also replicated across the entire 512×512 pixel image. In some embodiments, a pretrained model can be adapted to accept the 512×512×17 input and generate an estimate for total and boneless loin weights. In some embodiments, the image data can include an intensity, an x-coordinate, a y-coordinate, and a z-coordinate (e.g., for 3D images). In some embodiments, the loin boning sortation model can be fine-tuned to a regression task. In another embodiment, the loin boning sortation model may incorporate new data, including new scan image data 142 to further evaluate the input data.

In step 220, the loin boning sortation model may utilize input data including scan image data 142 in an image stack wherein the image data is pre-segmented to identify a middle layer or central layer using a fine-tuned network to identify carcass parameters (e.g., back fat, loin, ribs, belly, and spine) in each individual layer. The layer that includes the majority of the spine is identified as the central layer from the image stack, in one non-limiting example. In some embodiments, the scan image stack may be provided in the form of a 16-layer stack. In some embodiments, the 16-layer stack can be modified (e.g., cropped) to a 9-layer stack to correct for carcass rotation during the imaging process. In this example, the middle layer can be chosen as the layer with the most "spine" pixels. Additional layers can be added in some embodiments, wherein the additional layers can be associated with the carcass depth and the pizzle removed status.

In another embodiment, the image stack input can be further expanded to include the neighboring transducers from a segmentation output based on the location of the original image stack, creating a larger image-space input. In this embodiment, the segmentation output of each of the central layers can be input into the one or more deep learning prediction models. This embodiment can similarly include length coordinate calculation(s) and image data associated with the carcass before it is opened for evisceration or when determining if a pizzle is present for removal.

In at least this way, at step 220, the system can compile the input data with data elements and transform the data elements using one or more deep learning prediction models.

In step 230, the loin boning sortation model algorithm provides a prediction output for both boneless and bone-in weights according to one or more of the model embodiments described in connection with step 210.

At step 240, the system can apply an adjustment factor to the loin boning sortation model in order to improve the accuracy and effectiveness of the evaluation and analysis. The adjustment factor(s) may include a plurality of α and β values, applied linearly to the particular model being evaluated in accordance with the plurality of embodiments described in connection with step 210. The adjustment factors are evaluated as [YBoneless_adjusted, YBone-In Adjusted]=[YBoneless, YBone-In]*α+β. In some embodiments, adjustment factors may not be needed and/or applied.

At step 250, the loin boning sortation model is executed with the adjustment factors as applied in step 240 and the model outputs a customized processing option based on expected weight or yield, wherein the customized processing option includes trimming specification data 148 corresponding to the specific cuts the model determines should be performed on the specific carcass based on the specific carcass parameters as evaluated by the model. These customized processing options can be communicated to the processing unit 135 on the production floor. In one specific example, the output of the primal/subprimal training module can generate instructions for one or more cuts, which are communicated to a routing system and/or a cutting system that can be designed to route and/or cut the carcass (or portions thereof). In some embodiments, the carcass or meat sample(s) can be routed on a transportation system based on the output of one or more of the trained modules, such as routing particular meat samples to specific cutting stations and/or processing stations.

Figure 3:
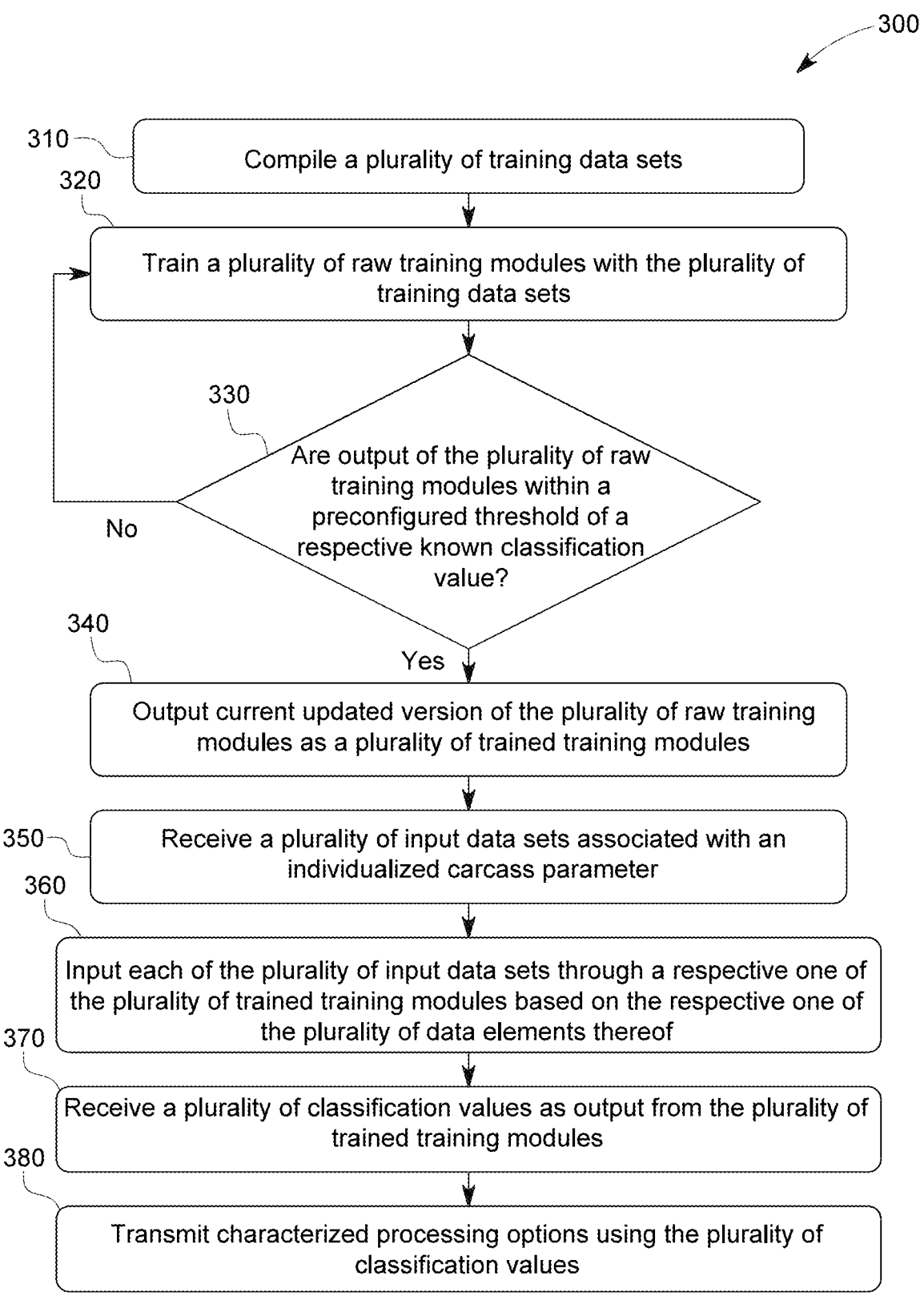
FIG. 3 is a flow diagram of a process for iteratively training a primal/subprimal weights and yield training module in accordance with an embodiment of the present invention.

FIG. 3 illustrates a training process 300 for iteratively training a primal/subprimal weights and yield training module to provide customized processing options based on classification values, according to embodiments of the present disclosure. At step 310, the system retrieves input data from a plurality of data sources 120 and/or the one or more databases 140 and compiles the data into a plurality of training data sets. In at least one embodiment, the present system may automatically or manually (e.g., in response to input) collect, retrieve, or access data including, but not limited to, scan image data 142, carcass composition metrics 144, calibration data 146, trim specification data 148, or module data 149, as described in relation to FIG. 1

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. Since many possible embodiments of the invention may be made without departing from the scope thereof, it is also to be understood that all matters herein set forth or shown in the accompanying drawings are to be interpreted as illustrative and not limiting.

Additionally, at step 310, the system can compile the input data into a plurality of training data sets by transforming raw data elements within the input data into standardized data element groups based on different classification values and by data type(s). When used throughout the present disclosure, one skilled in the art will understand that "transform" can include normalize, standardize, and other advanced analysis techniques for manipulating the data such that it can be processed, analyzed, and used to characterize processing options according to the present disclosure. In at least one embodiment, the data transformation can include one or more data modifications such as: 1) imputing missing data; 2) converting data to one or more formats (e.g., for example, converting string data to numeric data); 3) removing extra characters; 4) formatting data to a specific case (e.g., for example, converting all uppercase characters to lowercase characters); 5) normalizing data formats; applying image processing techniques; and 6) anonymizing data elements.

In at least one embodiment, the system evaluates the completeness of collected data. For example, the system may determine a magnitude of missing data in a collected data set and, based on the magnitude, the system may exclude data sets that are intolerably data deficient (e.g., and which may deleteriously impact further analytical processes).

At step 320, the system compiles (or retrieves from the database 140) a training data set including a known classification value that is used to iteratively train one or more raw training modules to create a plurality of trained modules. In one example, the system can input a training data set into a raw training module based on the data type of the input data. In one non-limiting example, this allows the system to iteratively train the training modules based on a plurality of input data sets of different data types and data elements, including data associated with individualized carcass parameters (like gender). In some aspects, the raw training module can be provided in the form of the primal/subprimal weights and yield training module and the trained model can be provided in the form of the deep learning prediction module.

At step 330, the output can then be compared to the known classification value(s) for the input data set. The one or more classification guidelines of the system can be updated for a plurality of nodes within the raw training modules based on the results of the comparing step, in order to iteratively train and improve the training module.

At step 340, when the output of the raw training module(s) is within a preconfigured threshold of the known classification values for the input training data sets, as determined during the compare step of 230, the plurality of raw training modules are output as trained modules.

The system in step 350, can receive and process a plurality of input data sets associated with an individualized carcass parameter (e.g., gender, length, image or portion of an image of a carcass, etc.), wherein each of the plurality of input data sets have a plurality of data types and data elements. In one embodiment, an individualized carcass parameter may have multiple associated input data sets. In step 360, the system can input each of the plurality of input data sets through a trained module based on the data type or data elements.

The system, in step 370, receives a plurality of classification values as outputs from the plurality of trained modules. In at least this way, the system can utilize a plurality of trained modules to output specific recommendations tailored to certain classification values. The system, in this example, uses the trained module(s) to evaluate the request based on a classification value associated with an individualized carcass parameter compared to a carcass average, along with the mechanisms for an adaptive feedback loop, to provide a customized processing option for one or more specific carcass based on a classification value. It will be appreciated by one skilled in the art that a combination of multiple classification values can be used in a single evaluation to provide a customized processing option and primal/subprimal weights and yield estimation based on a high level of certainty. The system can generated an estimated weight output including a predicted weight of the processed carcass and the primal/subprimal weights.

In step 380, the system characterizes processing options based on the classification value(s) and transmits the processing options to the processing unit 135 or other processing device. In some embodiments, the processing options are stored in a memory unit or the database 140 until the processing unit 135 is ready to process the carcass. Also, the system can include one or more secondary metrics as parameters in one or more processes to iteratively train a training module or a plurality of training modules (as described herein). When used throughout the present disclosure, one skilled in the art will understand that processes for "iteratively training the training module" can include machine learning processes, and other similar advanced artificial intelligence processes. For example, the system and processes of the present disclosure can calculate an estimated yield or weight for a plurality of primal and subprimals having different individualized parameters and can leverage the estimated yields or weights of carcasses with similar metrics as an input to an iterative training process for a customized processing option based on a plurality of parameters and adjustable classification values.

Figure 4:
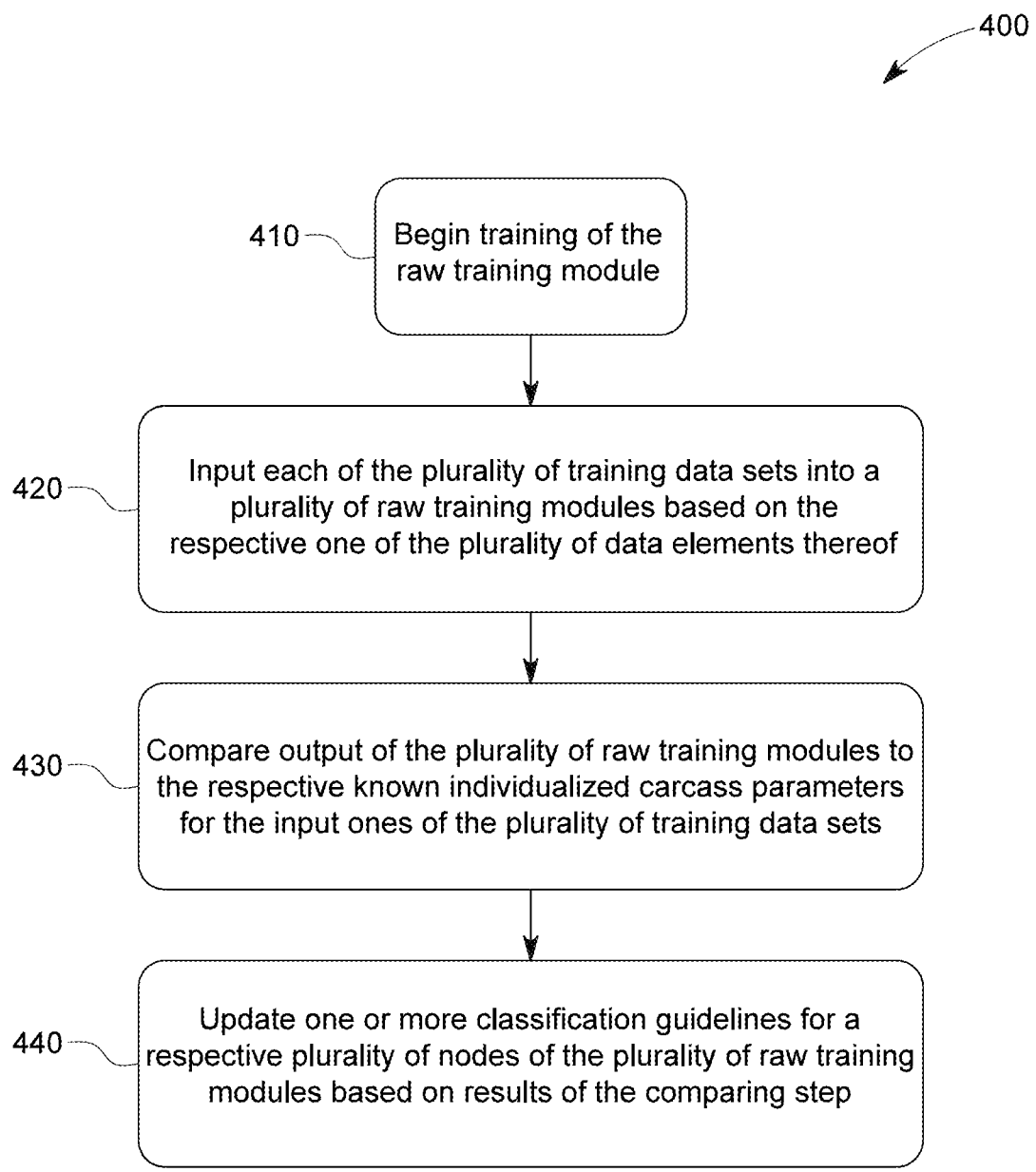
FIG. 4 is a flow diagram of a process for iteratively training a raw training module in accordance with an embodiment of the present invention.

FIG. 4 illustrates a training process 400 for iteratively training the one or more raw training modules, as shown in step 330 of FIG. 3. At step 410, the system begins to iteratively train the one or more raw training modules. For example, the system can generate a first version of the primal/subprimal weights and yield training module. The first version of the primal/subprimal weights and yield training module, in step 420, can process each of the plurality of training data sets, using known parameters and classification values, to generate a set of training outcomes (e.g., respective output classification values based on individualized carcass parameters). In one embodiment, the system may utilize the training module 115 or other feedback process, described in connection with FIG. 1, to perform various data analysis and modeling processes, including the generation and training of the first version of the primal/subprimal weights and yield training module in step 410 and for generating a customized processing option, including various components of a classification value based on carcass-specific factors and data elements in step 420.

At step 430, the system can compare the set of training outcomes from each of the plurality of training data sets to the training set of known classification values associated therewith and can calculate one or more error metrics between the respective output classification value and the known classification values. In at least one embodiment, the system may generate models, outcomes, predictions, and classifications for particular individualized carcass parameters using average models that combine aggregate impacts of the classification values and associated metrics that make up each individualized carcass parameter or group of parameters or other characteristics. In at least this way, the system creates the plurality of training data sets used to compare, at step 430, to the set of training outcomes. For example, the system may generate an aggregated model, outcomes, predictions, and classification values for a new carcass by identifying data elements associated with one or more individualized carcass parameters. The aggregated model, outcomes, predictions, and classification may assist the system in determining appropriate processing options in order to maximize primal/subprimal weights and yield and accurately estimate primal weights prior to leaving the slaughter floor.

During the compare step 430, the system also determines if the output classification value falls within a preconfigured threshold amount of the known classification value associated with one or more individualized carcass parameters of the plurality of raw training modules. In one example, if the primal/subprimal weights and yield training module determines a bone-in weight for a particular carcass and that identified weight is above or below a threshold percentage of what a carcass with similar parameters or metrics historically weighed post-processing, the system would identify this discrepancy at step 540. Otherwise, if the recommended classification value is within the threshold percentage, the raw training module is updated according to step 440. In some embodiments, there may be multiple classification values that contribute to a processing option, including but not limited to gender, length, carcass image, and/or a portion of a carcass image. The system can also be retrained to analyze a plurality of the one or more classification values in the retraining process to accommodate for these different carcass parameters, even if the system outputs a classification value within the preconfigured threshold amount.

If yes, at step 440, the system outputs or updates the raw training module as the trained module. In one embodiment, the training module 115 can further be configured to generate, train, and execute neural networks, gradient boosting algorithms, mutual information classifiers, random forest classifications, and other machine learning and related algorithms in order to complete at least steps 420-440.

If no, at step 440, the system may update one or more raw classification guidelines for a first plurality of nodes of the raw training module, such that the raw classification guidelines are updated based on analysis of the comparing step 430. The system can iteratively retrain the raw training module by repeating the process 400 with the updated one or more classification guidelines. For example, if the classification guidelines related to or associated with an individualized carcass parameter are significantly contributing to returning a processing option or primal/subprimal weights and yield estimation above the classification value associated with that specific carcass parameter, the system can increase or decrease the classification guideline related to that parameter and retrain the model.

The system can further be used to iteratively optimize the first version of the primal/subprimal weights and yield training module into one or more secondary version training modules by: 1) calculating and assigning an emphasis (e.g., weights) to each of the known training data sets (e.g., parameters or derivatives thereof); 2) generating one or more additional training modules that generate one or more additional sets of training module outcomes; 3) comparing the one or more additional sets of training module outcomes to the known outcomes; 4) re-calculating the one or more error metrics; 5) re-calculating and re-assigning emphasis to each of the classification guidelines to further minimize the one or more error metrics; 6) generating additional training modules and training module outcomes, and repeating the process.

In at least one embodiment, the system can combine one or more raw training modules to generate a trained module. The system can iteratively repeat steps 410-440, thereby continuously training and/or combining the one or more raw training modules until a particular training module demonstrates one or more error metrics below a predefined threshold for a particular classification value, or demonstrates an accuracy and/or precision at or above one or more predefined thresholds.

Figure 5:
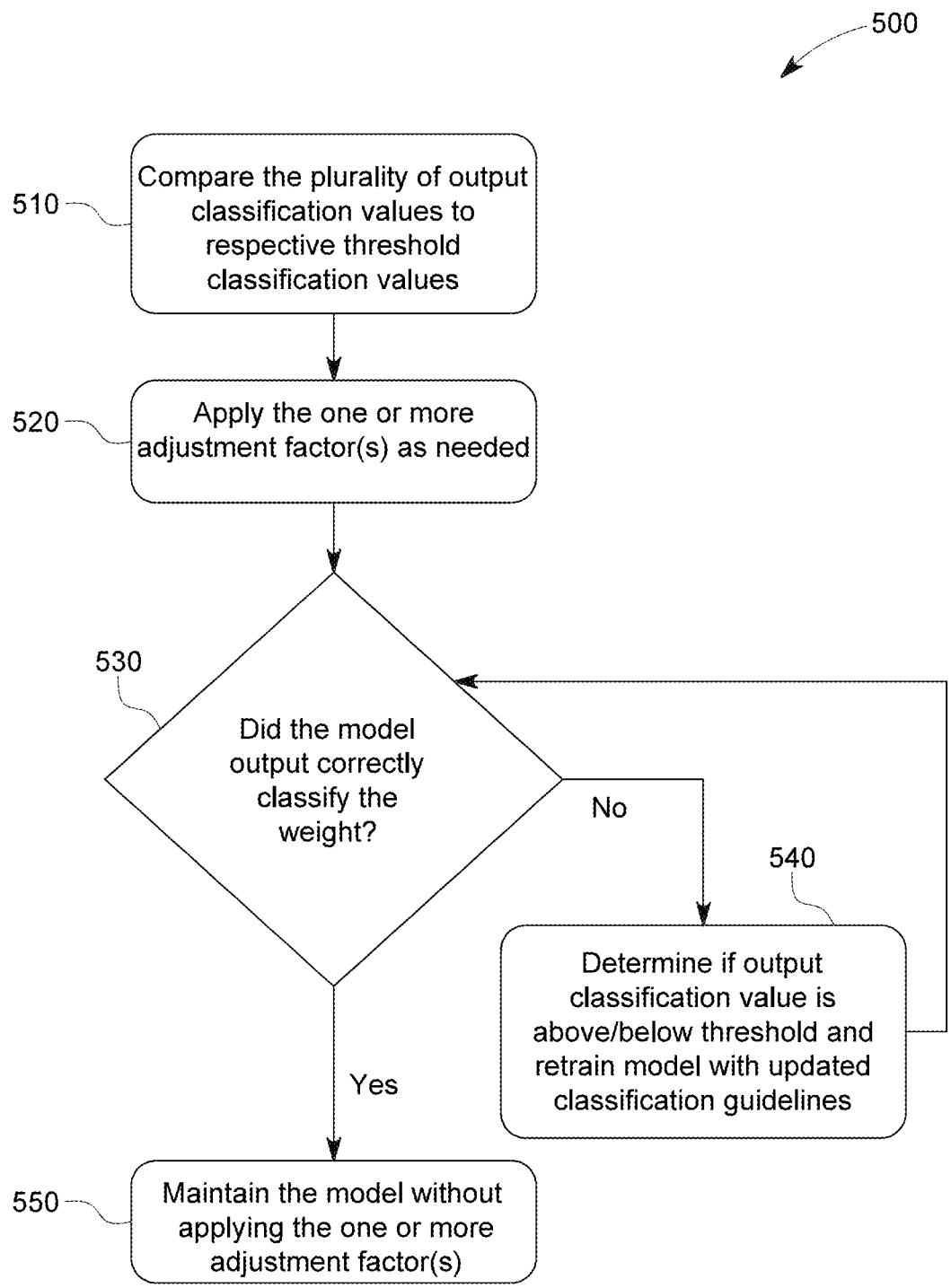
FIG. 5 is a flow diagram of a process for comparing specific classification values and updating processing options according to the outputs of the trained module in accordance with an embodiment of the present invention.

FIG. 5 illustrates a process 500 for updating a primal/subprimal weights and yield training model to characterize processing options and estimate primal/subprimal weights and yield(s) as the primal/subprimal weights and yield training module is iteratively retrained as input data is updated and/or the feedback loop modules of the training module 115 integrate with the system for iteratively retraining the trained modules. At step 510, the system compares the plurality of output classification values to respective threshold classification values. As described above, there can be multiple classification values associated with an individualized carcass parameter. In some embodiments, the system can use advanced analytics to compare a plurality of classification values to provide a customized output based on the specific carcass and/or classification value(s).

At step 520, an adjustment factor can be applied linearly to the primal/subprimal weights and yield training module, as needed, as described in more detail in connection to step 240 of FIG. 2. At step 530, the system determines if the estimated primal/subprimal weights and yield from the loin boning sortation model includes an accurate weight estimation based on the individualized carcass parameter related to the output classification value. If no, the system at step 540 determines if the output classification value(s) are above/below the respective threshold classification values and can retrain the module using updated classification guidelines, as described in connection with FIG. 4. This feedback loop and retraining process can be iteratively performed to improve the prediction model(s) as needed. If yes, at step 550 the system maintains the current model configuration and does not update the classification guidelines and retrain the model(s).

In one or more embodiments, the system can identify updated processing options based on classification values by evaluating and processing the updated data via one or more trained modules. The system can modify the processing options real-time based on the updated scan image data 142 and/or classification value(s).

Figure 6:
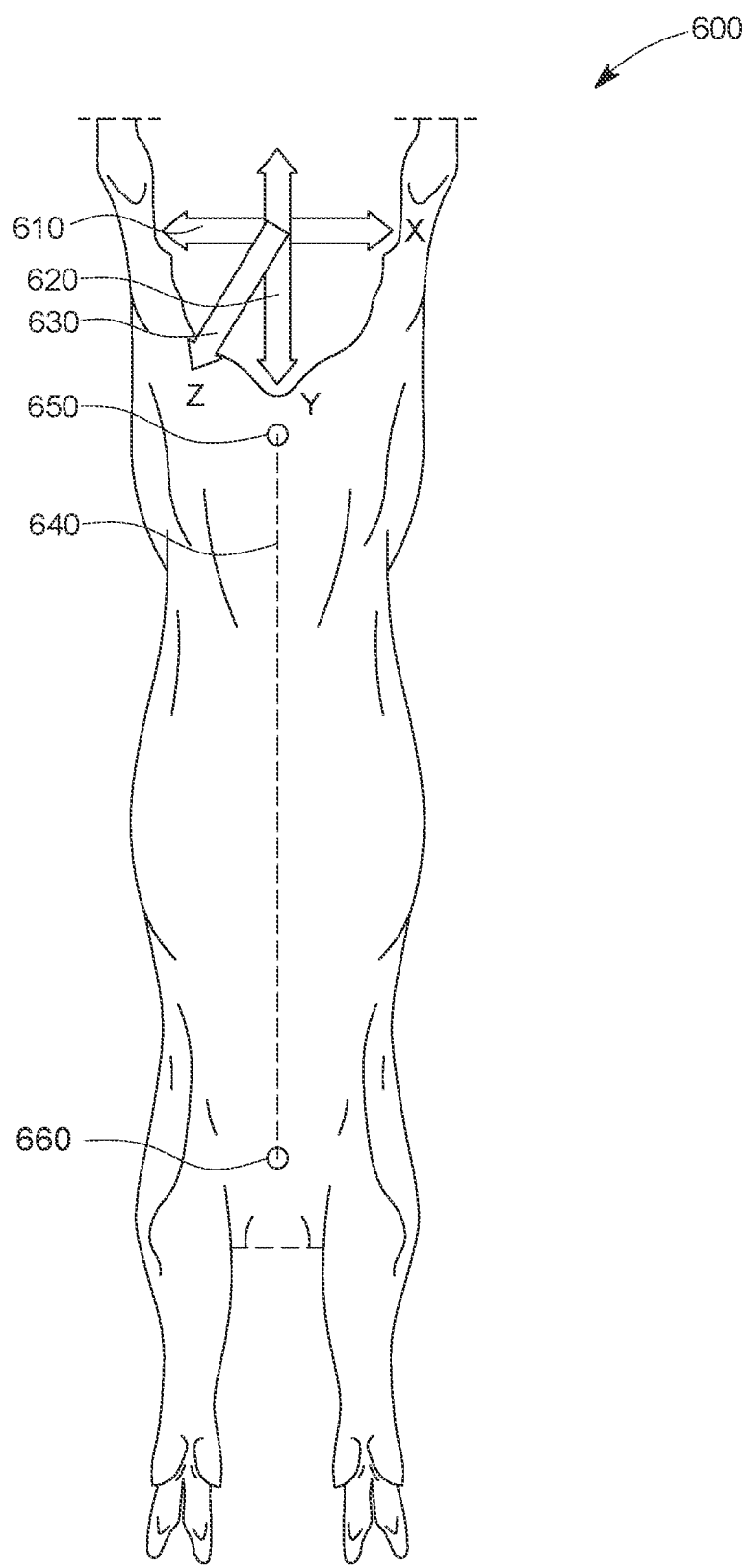
FIG. 6 illustrates a method of evaluating the coordinates of a carcass as input of the prediction module in accordance with an embodiment of the present invention.

FIG. 6 illustrates a diagram 600 of a carcass that is evaluated using a length calculation based on a combination of coordinate data elements extracted from one or more third-party image scanning devices. The measurements of coordinates are collected or retrieved by the system from the scan image data 142 stored in the database 140 and/or received from one or more data sources 120, as described in connection with FIG. 1. The scan image data 142 can be provided in the form of a 2D scan image and/or a 3D scan image. The coordinate data recorded are shown by the X coordinate 610, Y coordinate 620, and Z coordinate 630. The dashed line 640 represents the path that a third-party carcass opener device would take to open the carcass. The top point on the dashed line 640 represents a groin position 650, the bottom point on the dashed line 640 represents a brisket position 660. It will be understood that the coordinates recorded from the process 600 are different than the x-coordinate, the y-coordinate, and the z-coordinate associated with the 3D image information described in connection with FIG. 2.

In one embodiment, the length as a function of X and Y coordinates are calculated as:

$$\sqrt{(\text{Brisket } X - \text{Groin } Y)^2 + (\text{Brisket } Y - \text{Groin } Y)^2}.$$

The length as a function of X and Y and Z coordinates are calculated as:

$$\sqrt{(\text{Brisket } X - \text{Groin } Y)^2 + (\text{Brisket } Y - \text{Groin } Y)^2 + (\text{Brisket } Z - \text{Groin } Z)^2}.$$

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention.

What is claimed is:

1. A method for characterizing carcass processing options, the process comprising:
   compiling an input data set;
   compiling a training data set, the training data set having one of a plurality of data types and a known classification value associated with the one of the plurality of data types;
   training one of a plurality of raw training modules with the training data set by iteratively:
      inputting the training data sets into the one of the plurality of raw training modules based on the one of the plurality of data types;
      comparing outputs of the one of the plurality of raw training modules to the known classification value for the training data set input into the one of the plurality of raw training modules; and
      updating one or more classification guidelines for a plurality of nodes of the one of the plurality of raw training modules based on results of the comparing step; and
   determining the carcass processing options based on an estimated weight output from at least one of a trained module of the plurality of raw training modules; and
   transmitting the carcass processing options to a processing unit.

2. The method of claim 1, wherein the estimated weight output is calculated without the use of a scale-based weight measurement input.

3. The method of claim 1, wherein the input data set includes scan image data.

4. The method of claim 3, wherein the scan image data includes a 3D image of a carcass.

5. The method of claim 4, wherein the 3D image includes an intensity, an x-coordinate, a y-coordinate, and a z-coordinate.

6. The method of claim 1, wherein the estimated weight output includes a bone-in and boneless estimation.

7. A method for characterizing carcass processing options, the process comprising:
   compiling an input data set comprising scan image data;
   compiling a training data set including a plurality of data types and a classification value associated with each of the plurality of data types;
   iteratively training a plurality of raw training modules with the training data set;
   generating a trained module;
   processing the input data set into the trained module;
   determining the carcass processing options based on an estimated weight calculation output from the trained module; and
   transmitting the carcass processing options to a processing unit.

8. The method of claim 7, wherein the estimated weight calculation output is calculated without the use of a scale-based weight measurement input.

9. The method of claim 8, wherein the estimated weight output includes a bone-in and boneless estimation.

10. The method of claim 9, wherein the scan image data comprises a plurality of image data elements including a first scan image and a second scan image.

11. The method of claim 10, wherein the first scan image includes an image and carcass composition metrics and the second scan image includes a carcass length.

12. The method of claim 8, wherein the scan image data includes an ultrasound image of a carcass.

13. The method of claim 8, wherein the scan image data includes carcass composition metrics and a carcass length.

14. The method of claim 8, wherein the scan image data includes an ultrasound image of a carcass and a carcass length.

15. The method of claim 8, wherein the scan image data includes a 3D image of a carcass.

16. The method of claim 15, wherein the 3D image includes an intensity, an x-coordinate, a y-coordinate, and a z-coordinate.

17. A method for characterizing carcass processing options, the process comprising:
   compiling an input data set comprising scan image data;
   compiling a training data set including a plurality of data types and a classification value associated with each of the plurality of data types;

generating a trained module using the training data set;
processing the input data set into the trained module;
determining the carcass processing options based on an estimated weight calculation output from the trained module, wherein the estimated weight calculation output is calculated without the use of a scale-based weight measurement input; and
transmitting the carcass processing options to a processing unit.

18. The method of claim 17, wherein the estimated weight output includes a bone-in and boneless estimation.

19. The method of claim 17, wherein the scan image data includes an ultrasound image, carcass composition metrics, a carcass length, or a combination thereof.

20. The method of claim 8, wherein the scan image data includes an ultrasound image of a carcass.

\* \* \* \* \*